Jan. 6, 1970  M. HOUSS  3,487,987
STAMP DRIVER MECHANISM
Filed April 15, 1968  9 Sheets-Sheet 1

INVENTOR.
MAX HOUSS
BY Charles H. Brown
ATTORNEY

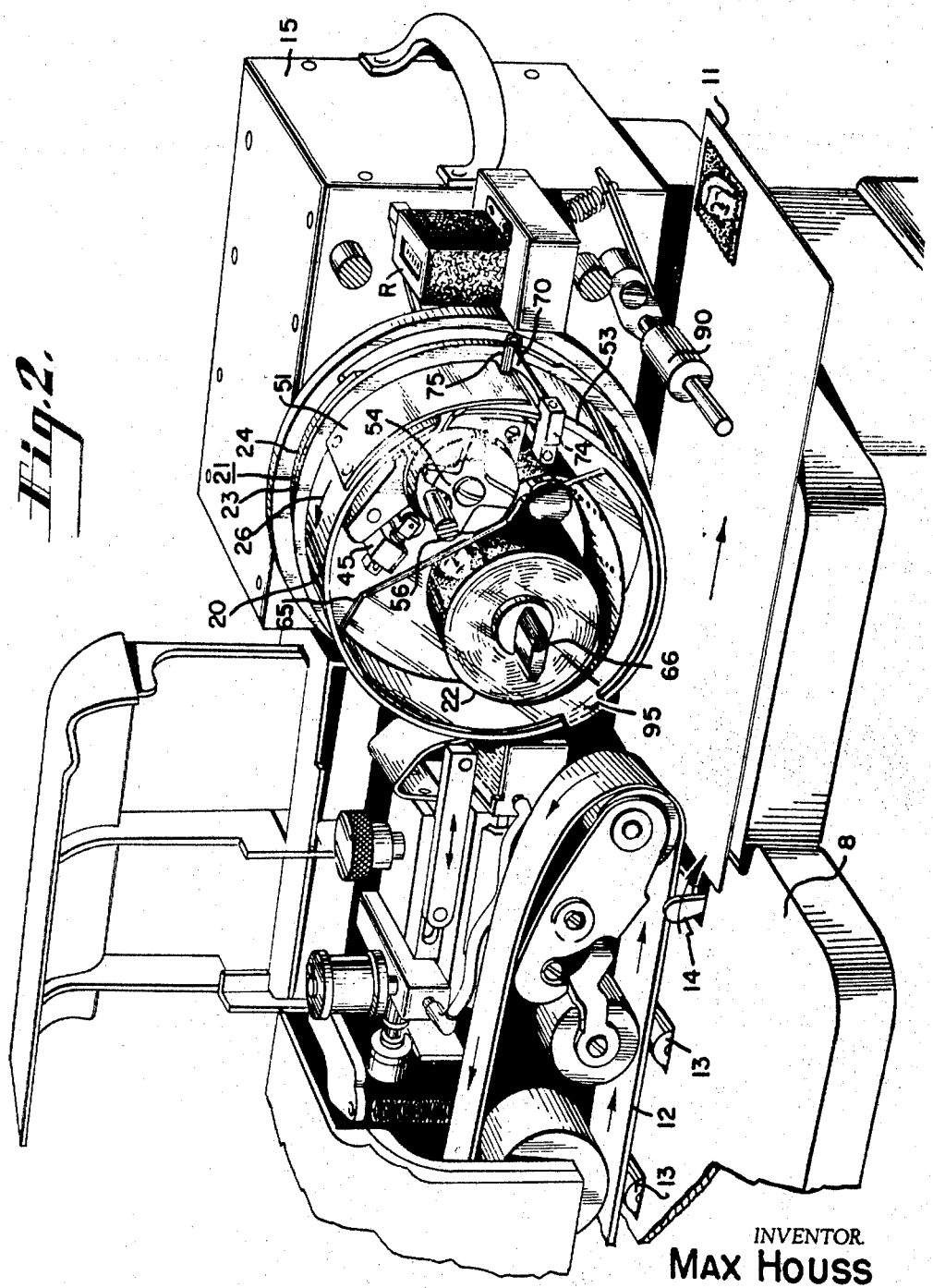

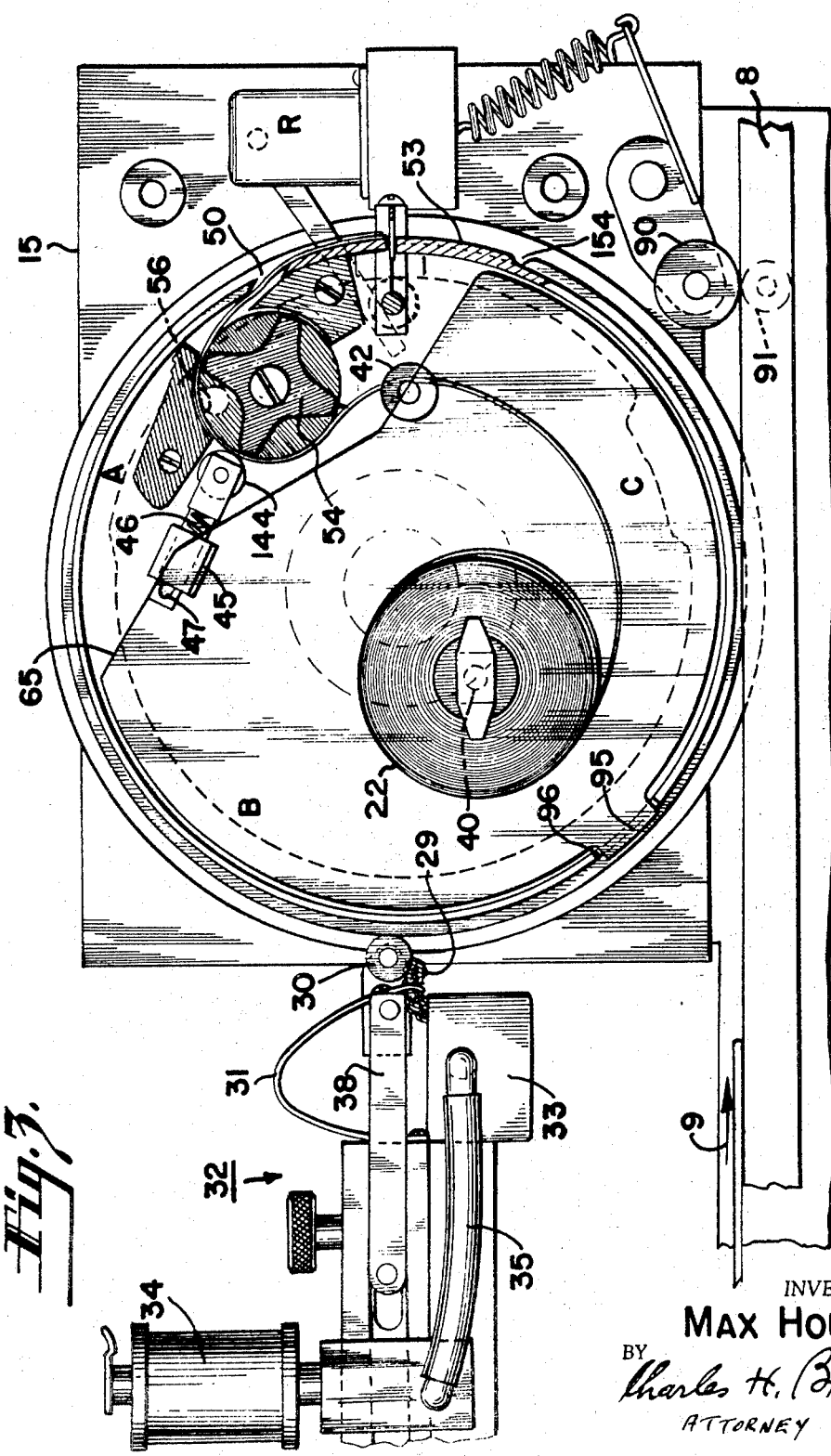

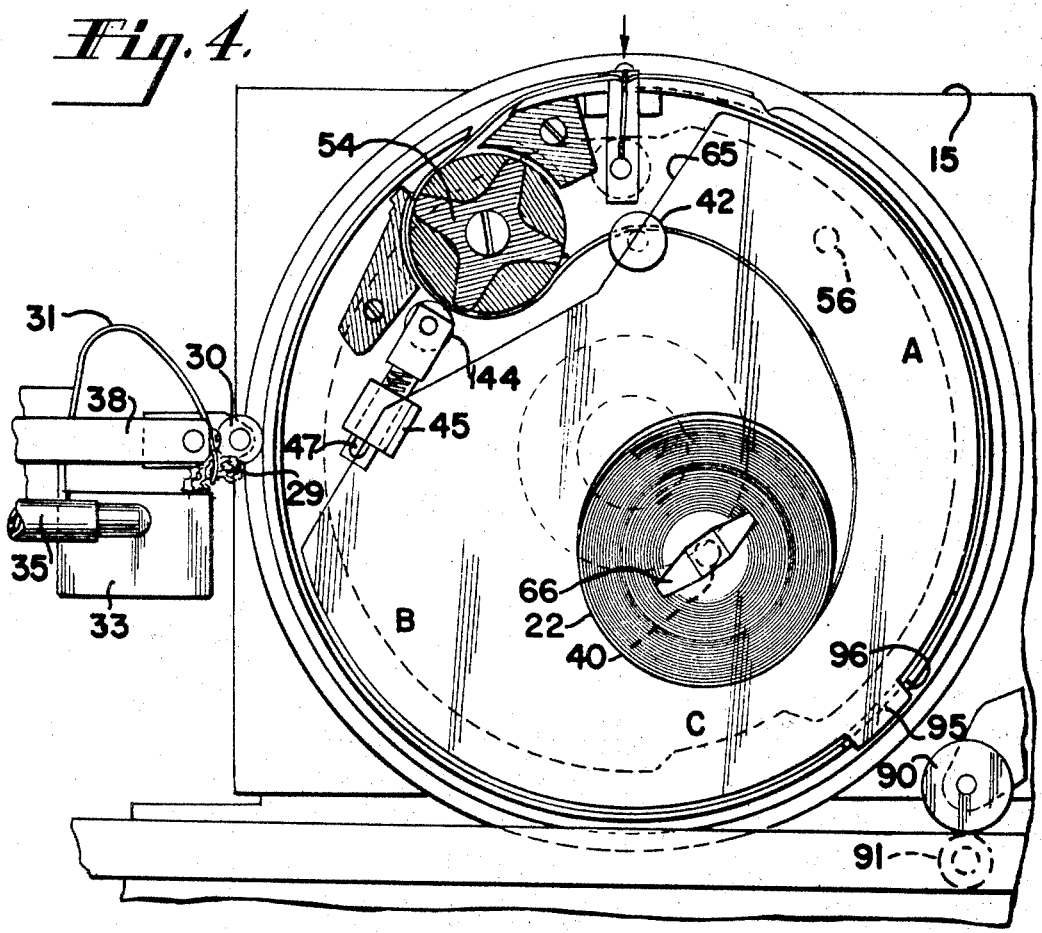
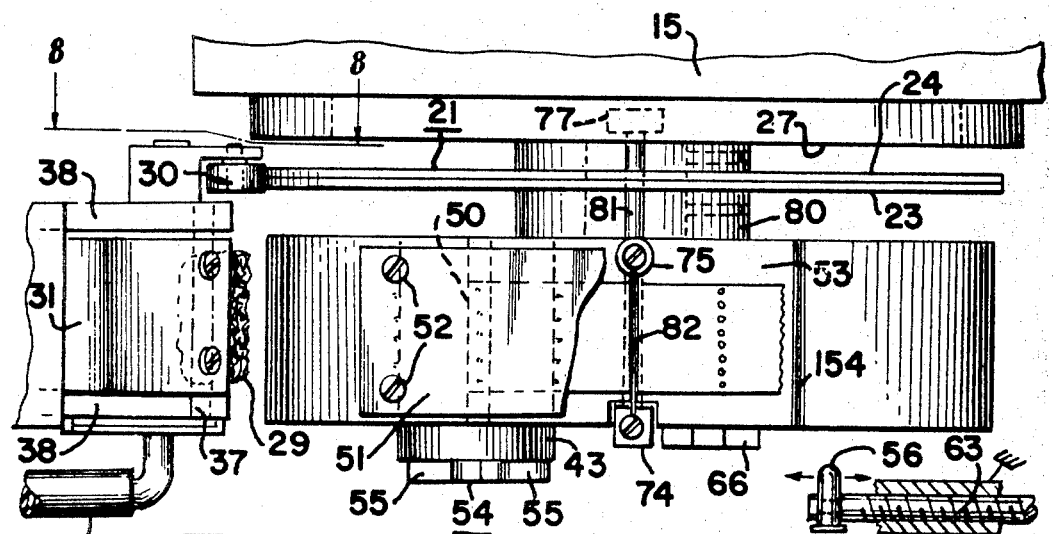

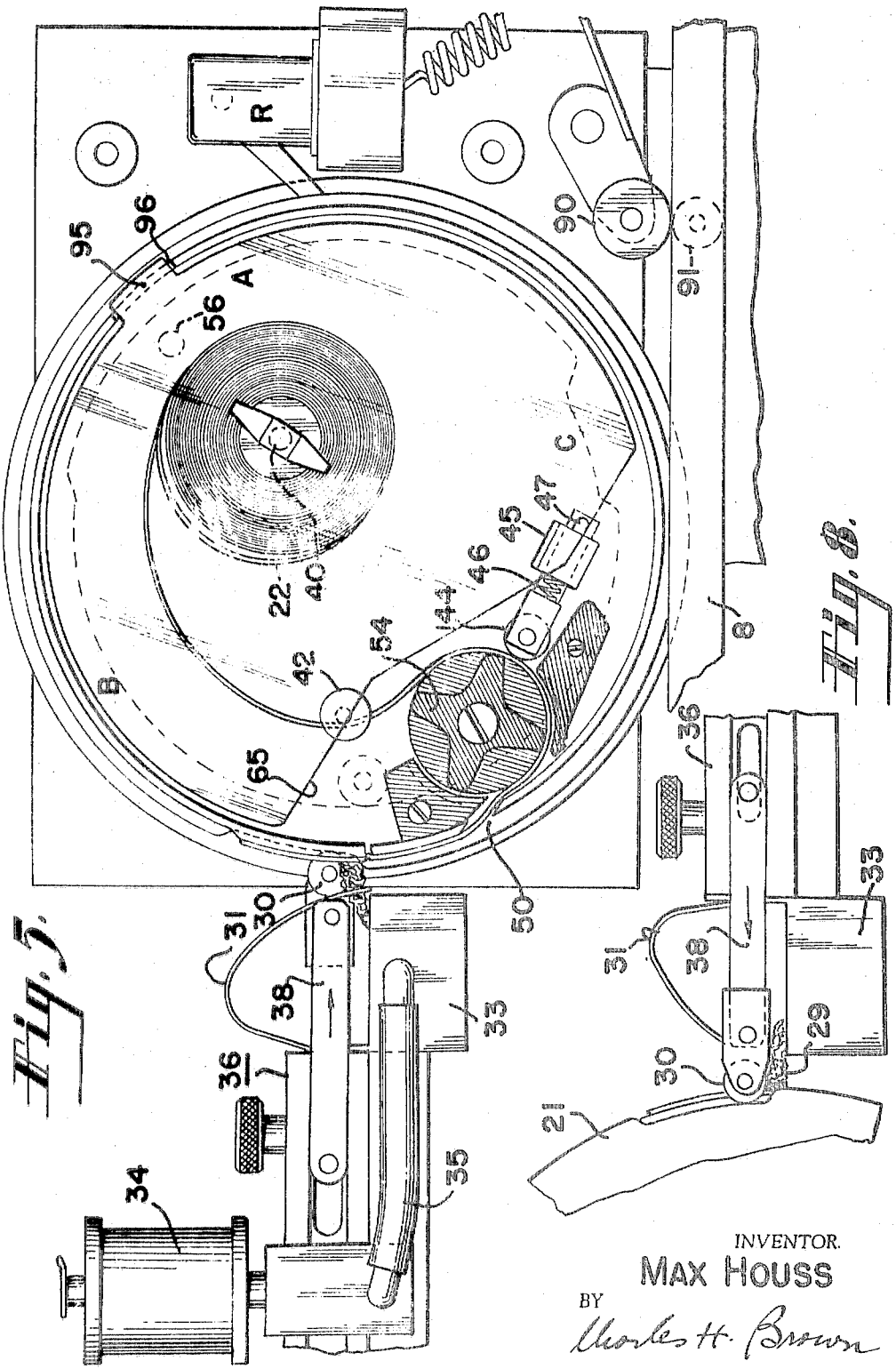

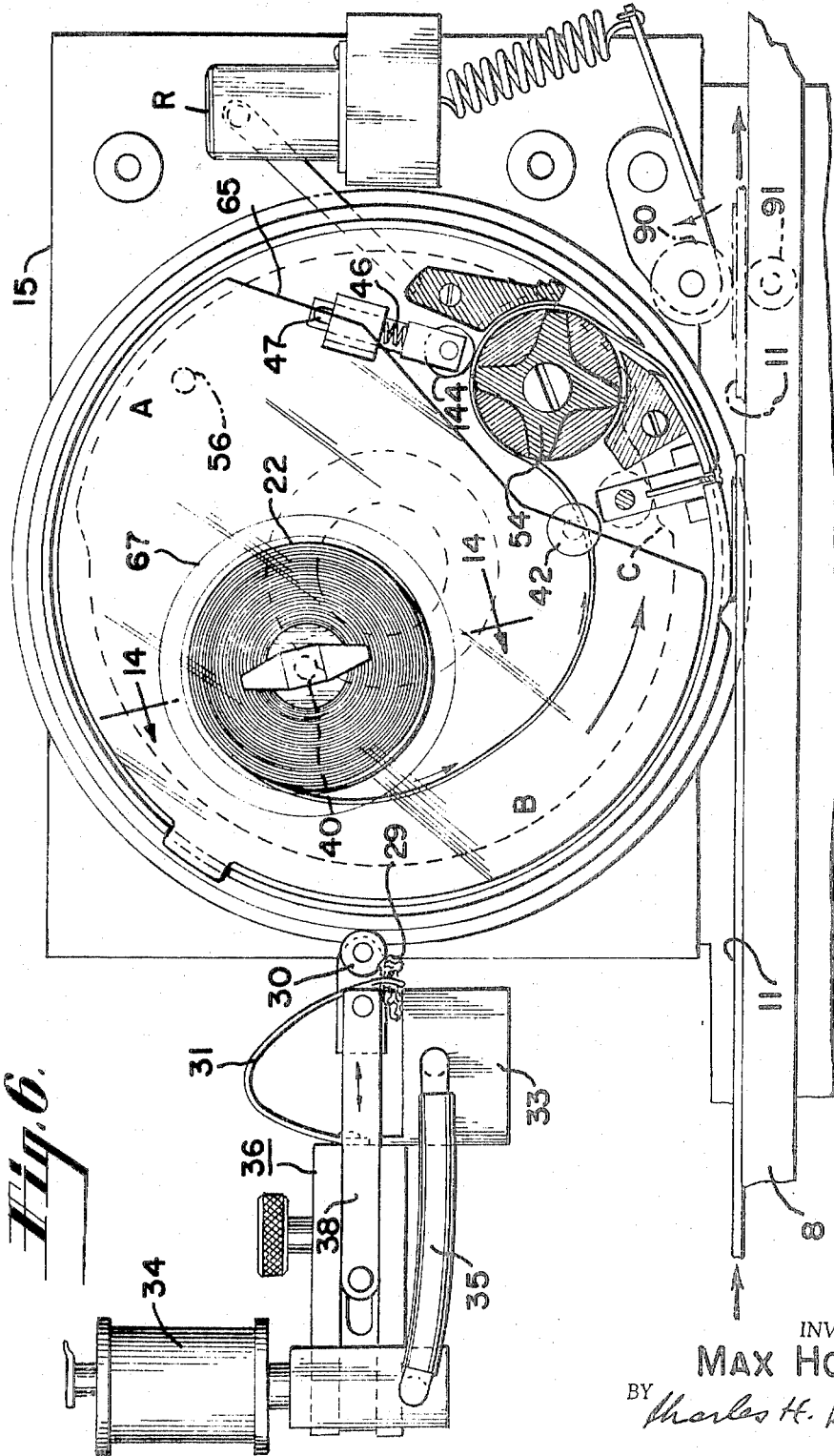

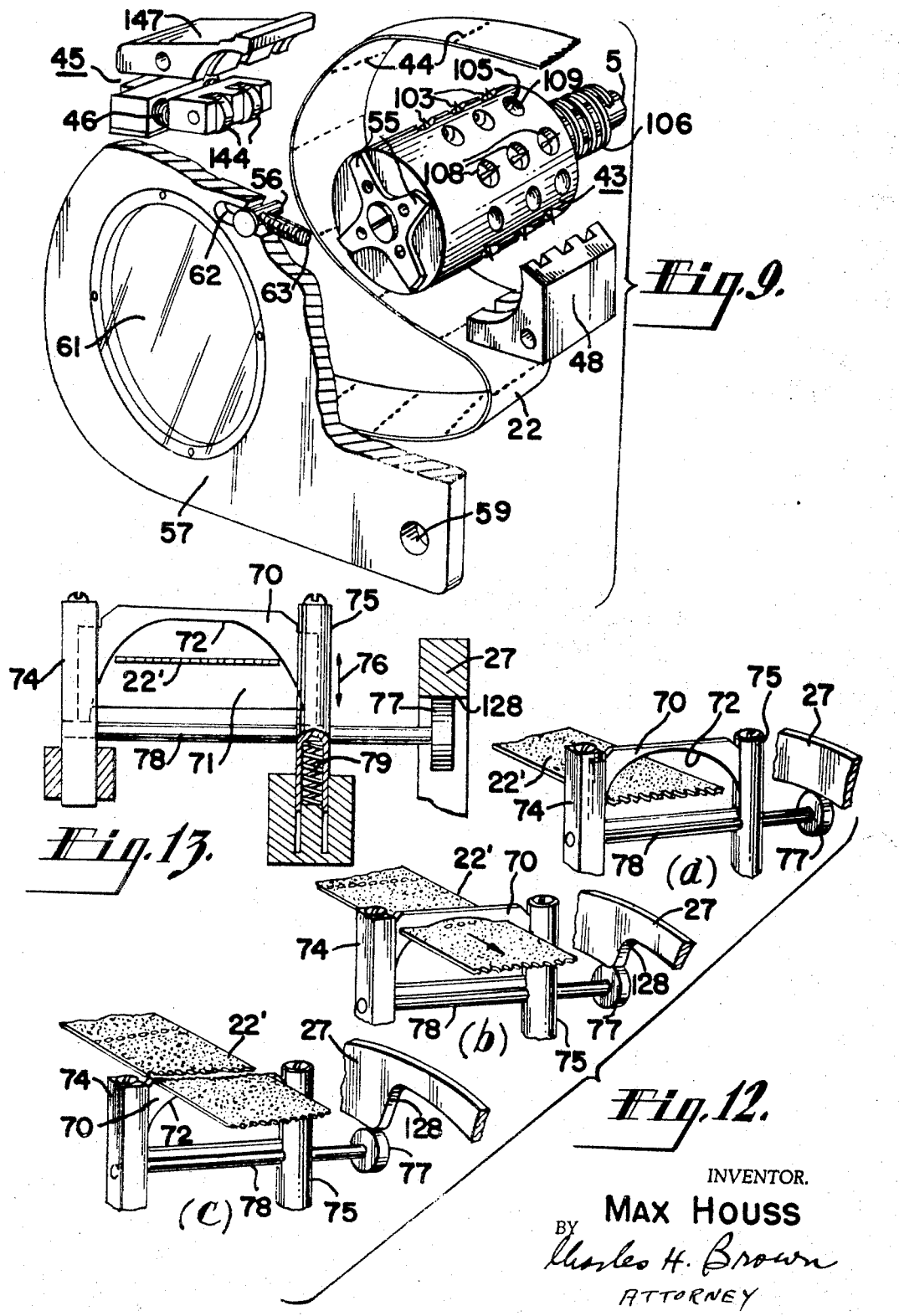

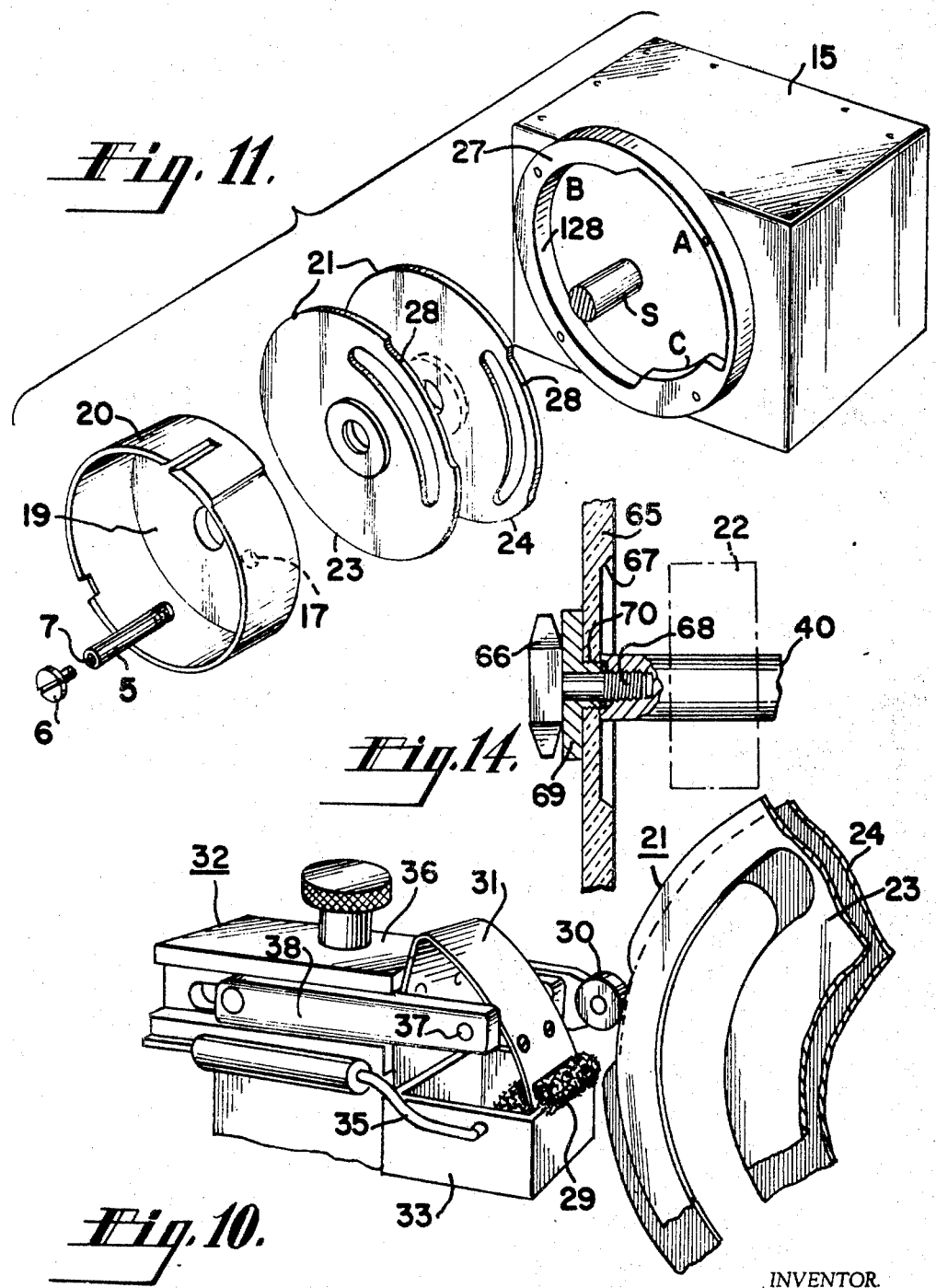

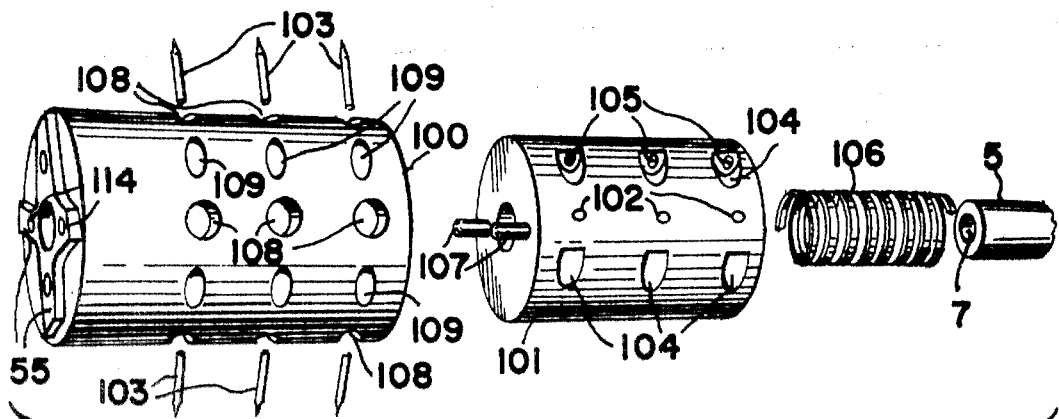
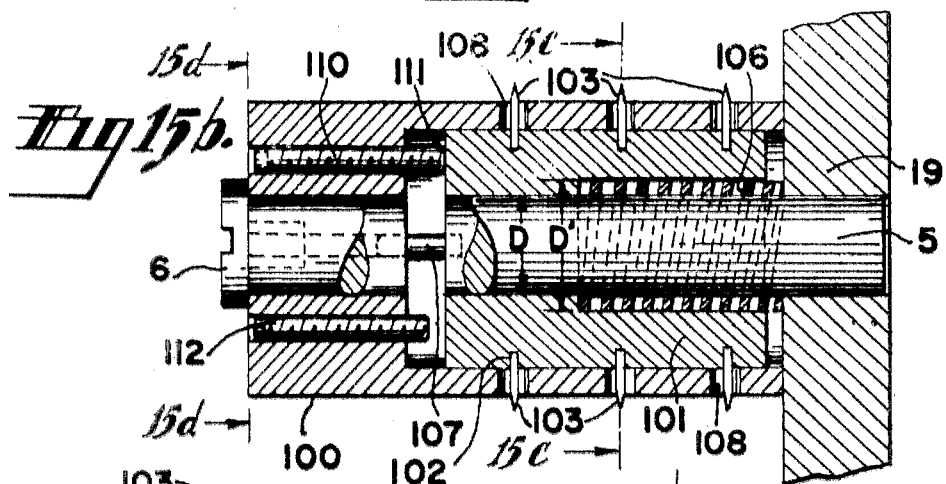
Fig. 15a.
Fig. 15b.
Fig. 15c.
Fig. 15d.
INVENTOR
MAX HOUSS
BY Charles H. Brown
ATTORNEY

United States Patent Office 3,487,987
Patented Jan. 6, 1970

3,487,987
STAMP DRIVER MECHANISM
Max Houss, 1123 E. 26th St.,
Brooklyn, N.Y. 11210
Continuation-in-part of application Ser. No. 474,654,
July 26, 1965. This application Apr. 15, 1968, Ser.
No. 721,263
Int. Cl. B65h 17/40
U.S. Cl. 226—79     9 Claims

ABSTRACT OF THE DISCLOSURE

The invention is a pin wheel drive assembly mechanism for advancing the stamps of a postage stamp affixer. The drive mechanism includes an adjustably positioned cylindrical plug within a shell which, in turn, is provided at one end with a plurality of radially arranged arms which respectively respond to impact for rotating the entire drive assembly. Pins are secured to the inner plug and protrude through holes in the outer shell for registering with the perforations in the stamp roll. The pin wheel drive assembly mechanism is self-indexing.

---

The present application is a continuation-in-part of my copending patent application Ser. No. 474,654, filed July 26, 1965, for "Postage Stamp Affixer Attachment" now U.S. Patent No. 3,393,113, patented July 16, 1968. My copending patent application discloses a postage stamp affixer attachment (as contrasted to a die stamp imprinting postage attachment) which replaces the "postage meter" in the machine and which takes the roll of stamps with printed side out as supplied by the Government, turns the stamps without rewinding to expose the gummed side to the wetting device, automatically severs the gummed postage stamps from the roll, and affixes the stamps on the mailing printed matter which is fed sequentially through the machine. An advantage in using actual postage stamps, as compared to printed postage, on mailing matter, is the personal touch or impact on the recipient of the mail who likes to feel that he is receiving a personal service as distinguished from that rendered to the vast multitude or public.

This invention is a novel drive mechanism for the stamps of a postage stamp affixer.

An object of the invention is to provide an improved pin wheel assembly mechanism which is self-indexing for use with a postage stamp affixer.

The invention is hereinafter described as one feature of and incorporated in the stamp affixer of my copending application.

BRIEF DESCRIPTION OF DRAWINGS

In the drawings,

FIG. 2 is a front perspective view of the stamp affixer attachment with the front cover removed, showing also a fragmentary part of a known automatic stamping machine in which the machine of the invention is placed;

FIG. 3 is a front elevation of the invention showing the rotatable portion of the attachment of the invention, with the front cover removed, with the stamp severing or rupturing blade in one position of its path of travel, together with the stamp wetting or moistening device;

FIG. 4 is a front elevation of the invention showing the rotatable portion of the stamp affixer attachment, partly broken away, in the first stamp severing or rupturing position. This is the normal or rest position of the attachment mechanism before the rotatable housing starts each cycle of operation constituting a single rotation or revolution in a counter-clockwise direction;

FIG. 5 is a front elevation of the mechanism of FIGS. 3 and 4 in the stamp wetting or moistening position;

FIG. 6 is a front elevation view of the mechanism of FIGS. 3, 4 and 5 showing the rotatable portion in the second stamp severing or rupturing position, after the stamp has been completely separated from the roll of stamps and about to be affixed to advancing printed matter, such as an envelope;

FIG. 7 is a top or plan view of FIG. 4;

FIG. 8 is a fragmentary view of the wetting or moistening device taken along the line 8—8 of FIG. 7;

FIG. 9 is an exploded view of the drive mechanism for the stamps and shows the self-indexing pin wheel assembly of the present invention for enabling the pins to register with the lines of perforations between adjacent stamps on the roll of stamps;

FIG. 10 is a front view of the stamp wetting device in the stamp wetting position and shows the cam follower in the cam groove. Certain parts of the wetting device have been omitted from FIG. 10 in the interest of clarity of illustration;

FIG. 11 is an exploded perspective view of the wetting and blade severing controlling cams and cylindrically-shaped drum housing for holding the roll of stamps;

FIG. 12 shows three fragmentary views (a), (b) and (c) of the three positions of the stamp severing or rupturing blade with its cam follower in three different positions;

FIG. 13 is a front elevation of the stamp severing blade and assembly, partly broken away, with its cam follower in open position on the cam, corresponding to the position shown in FIG. 12(a), and illustrates the manner in which the blade is spring loaded;

FIG. 14 is a sectional view taken along the line 14—14 of FIG. 6, showing the centrally positioned circular recess portion on the inner surface of the face plate; and FIG. 15a is an exploded view of the novel stamp driver mechanism of the present invention; FIG. 15b is a vertical section of the stamp driver mechanism of the invention with all component parts assembled together and mounted on its supporting shaft; FIG. 15c is a sectional view taken along the line 15c—15c of FIG. 15b; and FIG. 15d is a front view of the pin wheel shell taken along the line 15d—15d of FIG. 5.

Throughout the figures of the drawing the same parts are designated by the same reference numerals.

DETAILED DESRIPTION

Figure 1:
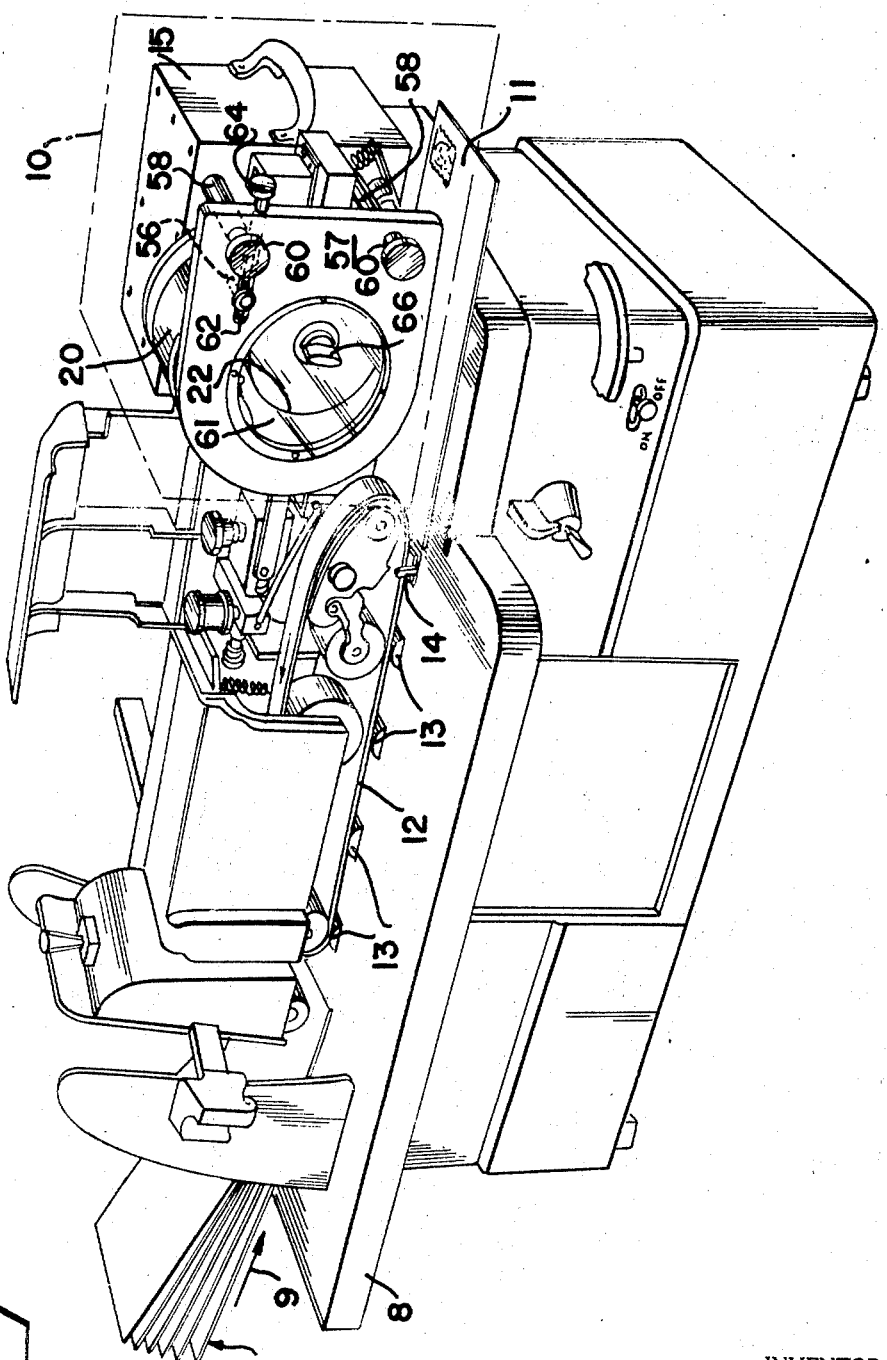
FIG. 1 is a perspective view of a known automatic stamping machine provided with a postage stamp affixer attachment. The attachment is shown within the phantom dash lines.

FIG. 1, except for the mechanism shown within the phantom dash lines 10, shows a well known Pitney-Bowes machine for sequentially passing a stack 11 of printed matter in the direction of arrow 9 over a bed 8 through the machine for the affixation of postage from a "postage meter" by the impression of a die of fixed denomination. This known machine uses an endless belt 12 which travels over smooth rollers 13. A trip lever 14 responds to the impact or passage of the advancing printed matter, such as an envelope or a card, to actuate a clutch-driven drive shaft for a single revolution. The clutch and drive shaft are not shown but are located in the rear of the mechanism shown by dash line circle 10. The known "postage meter" would normally occupy the space occupied by the mechanism within the phantom dash lines 10. The trip lever 14 is actuated once each time an envelope or card passes it in its travel to the stamp meter, and each actuation of the lever 14 operates a spring-loaded clutch which, in turn, causes the drive shaft to rotate one revolution; hence the drive shaft, by suitable gear means, is intermittently driven for a single cycle or revolution. The postage stamp affixer attachment shown within dash line circle 10 merely replaces the known "postage meter" in the known Pitney-Bowes machine, and is driven by the same clutch-actuated shaft which intermittently drives the "postage meter."

The postage stamp affixer attachment includes a suitable gear box 15 for driving, in response to a clutch-actuated drive shaft S (see FIG. 11), a metallic cylindrically-shaped drum-like housing or casing 20 adapted to contain therein a roll 22 of gummed postage stamps as purchased from the Government. The drum housing 20 is a solid piece of metal which is hollowed out on a lathe to provide a thick back or rear wall.

A cam 21 made up of two contiguously positioned metallic circular discs 23 and 24 is positioned between the housing 20 and the gear box 15 and fixedly mounted on the same shaft S which drives the housing; hence the cam 21 and the housing are uncontrolled and simultaneously rotatably driven together in the direction of arrow 26 (see FIG. 2). The gear box 15 is not shown in detail because it is of any suitable type well known in the art and contains suitable gear trains rotating the cylindrically-shaped housing 20 and disc cam 21.

The two discs 23 and 24 of cam 21 are each provided with an arcuate-shaped indent 28. Mounted on the casing for gear box 15, in stationary manner, is a hollowed-out steel circular member 27 having an irregular inner cam surface 128. The arrangement and physical relationship of these elements is shown clearly in the exploded view of FIG. 11.

The housing 20 is made of steel and has a closed metallic backing 19 which is about five eighths of an inch (⅝") thick and is an integral part thereof to which the driving shaft is fastened. A hole 17 in the thick backing 19 accommodates a stationary rod or shaft 5 which is force-fit for about one-half inch into the hole 17. Shaft 5 supports the pin wheel assembly drive mechanism 43 of the present invention as will be described later. The free end 7 of the shaft 5 is hollow for a small length and threaded in the interior to accommodate a retaining screw 6 for holding the drive mechanism on the shaft. An eccentrically positioned post 40 in the interior of the housing 20 supports a roll of postage stamps 22 with the printed side out and the gummed coated side in, in the manner purchased from the Government. The stamps of the roll first pass over a smooth round post 42 and then over the pin wheel assembly stamp drive mechanism 43 of the present invention. As will be noted from FIG. 9, this stamp drive mechanism is provided with a plurality of spaced pins or needles which are designed to enter into the spaced lines of perforations 44 separating adjacent stamps on the roll 22. The stamp driver mechanism includes an outer metallic wheel shell 100, an inner metallic plug 101, and a compression spring 106, all of which are supported on the stationary shaft 5 and over which the driver mechanism is rotatable when triggered.

The inner plug is made of hard precision ground steel and is provided with two types of holes, one type having small round holes 102 for accommodating pins or needles 103, and the other type having larger holes 104 arranged askew at a slanted angle and adjacent the smaller holes for accommodating set screws 105 for holding the pins 103 in place when these pins are inserted into holes 102. Each hole 102 accommodates a single pin. There are three small holes 102 in a straight line row arranged longitudinally and there are four such straight line parallel rows, thus making a total of twelve holes for twelve pins. A larger hole 104 for a set screw 105 is provided for each small hole 102 so that there are four straight line rows of holes 104 with three holes 104 arranged in a row. These last rows are also parallel to one another and arranged longitudinally. The larger holes 104 are threaded in their interiors and communicate with the smaller holes 102 to enable the set screws to securely contact the pins or needles. The inner plug is solid except for a hollow interior which has two different interior diameters D and D'. The end with the smaller diameter D fits snugly over the stationary shaft 5 while the end with the larger diameter D' accommodates the compression spring 106 over that portion of the shaft 5 which is nearest the back wall 19 of the drum 20. The compression spring 106 is held firmly in place over the shaft 5 inside the plug 101 and between the back wall 19 of the drum housing 20 and a shoulder defining the line of demarcation between the two diameters D and D' in the interior of the solid inner plug, as shown in FIG. 15b, thus exerting outward pressure on the inner plug 101. One end of the spring is positioned against the back wall 19 of the drum housing and the other end of the spring rests against the shoulder dividing the small and larger diameter portions. The end of the inner plug farthest away from the back wall 19 is provided with two oppositely disposed guide studs or pins 107 which fit snugly into two correspondingly positioned holes 114 in the closed end of the outer wheel shell 100 to prevent independent rotary motion of the shell 100 and inner plug 101. Put another way, the entire stamp driver mechanism 43 composed of outer shell 100 and inner plug 101 rotate as a single unit on stationary shaft 5 when triggered to do so.

The outer metallic shell 100 is also an extremely hard precision ground metal and is also provided with round holes 108 and holes 109 arranged askew or at a slanted angle. The slanted holes 109 permit the set screws to pass therethrough for threading into slanted holes 104 of the inner plug. The round holes 108 are larger than the holes 102 of the inner plug and permit the needles 103 to pass therethrough and into the holes 102 for securement by the set screws. There are the same number of holes and rows in the outer wheel shell 100 as there are in the inner plug and the large round holes 108 are designed to register with the small round holes 102 while the slanted holes 109 register with the slanted holes 104 when the inner plug 101 is positioned within the outer wheel shell 100 as indicated in FIG. 15c.

The closed end of outer wheel shell 100 is provided with a milled-out portion in the form of a star wheel which is integral therewith and constituting four radially positioned arms 55. Stated otherwise, the closed end of the outer shell is machined into a unique star like wheel. The arms 55 have tapered sides and are wider at the central portion than at their ends. Note FIG. 9 and FIG. 15d. Two of these oppositely disposed arms 55 are provided with round holes 114 extending completely through the arms and associated closed outer end of the shell for accommodating the guide pins 107 on the adjoining end of the inner plug 101. The other two oppositely disposed arms 55 are provided with threaded holes which pass completely through these arms and the closed end of the outer shell. In one of these threaded holes there is placed an Allen head screw 110 which has one end 111 abutting the adjoining solid portion of the end of inner plug 101. When the screw 110 is tightened, the end 111 is forced against the plug 101 and causes the plug to exert pressure against the compression spring 106, thereby moving the plug 101 back toward the rear or back wall 19 of the drum and hence moving the position of the fixed needles 103 also toward the back wall 19 of the drum housing. The outer threaded hole in the other arm 55 accommodates a screw 112 whose end adjacent the inner plug 101 acts as a stop for preventing the inner plug which is in spring compression from coming too far forward. The large holes 108 in the outer shell 100 are much larger than the diameters of the small holes 102 and the needles, thereby permitting full clearance for the necessary range of adjustments in the positions of the needles on the stamp driver mechanism of the invention. In an embodiment of the invention constructed and used, the range of adjustments for the needles extended over a distance of .065 inch.

The stationary shaft 5 is provided with the retaining screw 6 which holds the entire stamp driver mechanism of the invention (outer shell, inner plug, needles, spring) against the back wall 19 of the drum housing and permits rotation of the entire driver assembly when it is tripped by the engagement of a trip lug 56 with one of the arms 55 of the star wheel arrangement as described later. The amount of rotation of assembly or shaft 5 is controlled by the shape of the arms 55 and only for twenty-five percent (25%) of one revolution of the assembly. The retaining screw 6 effects a drag or self-regulating braking action on the driver mechanism, thereby permitting only one-quarter of a turn of the driver assembly each time an arm 55 engages the trip lug 56.

The needles 103 are just long enough to be held in place by the set screws 105 and still protrude a sufficient distance out from the outer shell 100 to act as sprockets for advancing the roll of stamps as required. By way of example, the needles need be only about one-quarter of an inch long.

In assembling the stamp driver assembly mechanism 43 of the invention, the inner plug 101 is slid into the outer shell 100 and the respective holes aligned properly before the needles 103 are inserted into holes 108 of the outer shell and holes 102 of the inner plug.

As the stamp driver mechanism 43 is partially rotated each cycle or revolution of the drum housing 20 by the impact of an arm 55 with a stationary lug 56 which is attached to an outer stationary metallic cover 57, the postage stamps are advanced in their passage from the roll 22 toward and out from the exit slot 50. Note FIGS. 1 and 9.

The adjacent needles or pins in the same horizontal line are spaced apart sufficiently to permit a pair of rollers 144 on a bracket 45 to rest against the stamp and hold it firmly on the pin roller 43. A spring 46 in the bracket 45 assures a desired degree of pressure of the rollers 144 against the stamps. To enable threading the roll of stamps over the pin roller when the stamps are first placed into the mechanism of the invention, these rollers 144 are movable away from the pin roller 43 by the use of a suitable tool which by insertion into a slot 47 in the rear of the bracket causes the rollers 144 and its supporting elements to be retracted against the springs and away from the pin roller 43. See FIGS. 3 and 4. Positioned on opposite sides of the pin roller 43 are the metallic brackets 147 and 148 which are grooved to permit the pins on the roller 43 to pass freely therethrough. Bracket 48 strips the stamps off the pin roller 43 and guides the stamps to the exit slot. Metallic brackets 147, 48 and 45 are mounted on the closed back 19 of drum wheel or cylinder 20.

The drum housing 20 is provided with an exit slot 50 for enabling the postage stamps to emerge from the housing with the gummed side facing out as the housing rotates and the roll 22 of stamps unwinds. This slot 50 need not and preferably does not extend over the entire width of the cylindrical housing 20. The sides of slot 50 are tapered, particularly that side towards which the stamps advance as they emerge from the housing.

On the exterior surface of the cylindrical housing 20 and extending over a small area on both sides of the exit slot 50 there is provided an arcuate-shaped moisture shield cover 51 which is fastened at only one end to the housing 20 by suitable fasteners 52, such as threaded screws. See FIGS. 2 and 7. The other end of the moisture shield cover 51 is open. The shield is spaced away from the outer surface of the housing over the exit slot 50 and beyond such exit slot in the direction in which the stamps advance outside of the housing so as to permit the feeding of stamps between the shield cover and the housing. The metal thickness of the housing 20 immediately beyond the open end of moisture shield cover 51 at the region 53 is thicker than the metal thickness of the housing at other parts thereof on its cylindrical surface, as shown. See FIGS. 3 and 7. Specifically, the outer surface of the cylindrical drum housing 20 is undercut at 154 immediately beyond the stamp location to prevent the printed matter, such as an envelope or card, from being distorted due to rotatable motion of the housing 20, which motion causes air pockets. The housing 20 thus has a maximum outer surface diameter at the location on which the stamp rests after emerging from the exit slot 50 and before being moistened and severed, as will appear hereinafter, thereby assuring a positive position register and immediate affixing of the stamp on the printed matter. As will also appear later on in the description, there is provided a wetting device having a wetting pad which rides over the shield cover and is so timed that it together with the shield permits the wetting of only that stamp or stamps which have emerged from the space between the shield and housing outer surface and are being held by the severing blade.

The outer stationary cover 57 is spaced away from the housing 20 and supported by two posts 58 extending from the gear box casing 15 and into which bolts passing through holes 59 (note FIGS. 1 and 9) in the cover 57 are threaded. The posts 58 are undercut at their ends remote from the gear box and provided with threaded hollow interiors at these open ends. The threaded bolts are attached to handles 60. The stationary metallic cover 57 is provided with a transparent plastic window 61 to enable visual observation of some of the parts behind the window. The stationary lug 56, which causes the stamp driver assembly mechanism 43 to rotate a one-quarter (¼) turn by the impact of this lug on one of arms 55 of the star wheel as the housing 20 (to which the pin roller and wheel are fastened) rotates past the stationary lug, is adjustable in position in a slot 62 in the metallic cover 57 (note FIGS. 1 and 9). This adjustment is accomplished by a handle 64 (note FIG. 1) attached to a rotatable worm or gear 63, the threads of which enter and pass through a threaded hole in the lug 56. Note FIG. 9. The purpose of this adjustment in position of the lug 56 is to vary the precise time of impact of the wheel with the lug, thereby varying or adjusting the timing of the advancement of the stamps over the pin roller, and hence advancing or retarding the severing position of the stamp under the severing blade.

The housing 20 is provided with a circular removable transparent plastic face plate 65 shown partly broken away in the drawings. This face plate is in disc form and is transparent to enable visual observation of the roll of stamps behind it and within the cylindrical drum housing 20. A suitable knob 66, knurled or otherwise (note FIG. 14), is provided on one end of a screw 68 which passes through a centrally positioned hole in the face plate and threadedly engages the threaded interior end part of the eccentrically positioned post 40 which supports the stamp roll 22, to thereby hold the face plate in place on post 40. Note FIG. 14. Face plate 65 is undercut on its inner surface at 67 for a circular area adjacent the central portion thereof. The thicker larger diameter portion of the face plate 65 contacts the large size rolls of postage stamps and acts as a light brake on the roll as it tends to unwind, while the thinner inner undercut portion 67 permits the small size rolls of postage stamps to unwind freely in unrestricted manner. Since different rolls of postage stamps, as purchased from the Government, vary slightly in width, due to the manufacturing processes, means are provided for accommodating or compensating for these variations in width of the stamp rolls. This is achieved by a stand-off fitting 69 positioned between the knob 66 and the face plate and which has a hollow nipple 70 provided with threads on the exterior surface thereof attached to a knurled adjusting knob. The nipple 70 threadedly engages threads in the centrally positioned hole of the plastic face plate 65. The interior diameter of the hollow nipple 70 is slightly larger than the diameter of the threads on screw 68, thereby permitting the screw 68 to slide freely within the nipple 70 when it is desired to remove the face plate from or attach it to the post 40. By turning the circular knurled kob fitting 69, the knob 66 can be placed closer to or further away from the face plate and the end of post 40, due to the interposition of the adjustable fitting.

The face plate 65 is so designed that it has a small arcuate-shaped section 95 which fits into a notch or recess 96, on the adjacent circular edge of the cylindrical metal housing 20, to prevent the roll of postage stamps 22 from wandering out of the housing 20 as the roll 22 unwinds. Without this arcuate-shaped section 95 and the notch or recess 96, the stamps may wander and slide into the space between the face plate and the interior cylindrical wall of the housing 20 and cause tearing of the stamps.

THE WETTING DEVICE

The wetting device for moistening the gummed coated surface of the stamps includes a cam follower roller 30 which travels over the outer peripheral surface of circular cam 21 as the cam rotates. See FIG. 10. An arched resilient metallic sheet 31, for example beryllium, holds a wetting pad or sponge 29 in a slot near one end of the sheet 31. The wetting pad extends into a water reservoir 33 which is fed with water from a container 33 through a tube 35. The cam follower roller 30 is fastened to that end of arched sheet 31 which holds the wetting pad 20, and this same end of sheet 31 is fastened by screws to a bar 37 which in turn is linked at both ends to bars 38, 38 slidable in oppositely disposed slots in a bracket 36 (note FIG. 7). The other end of arched sheet 31 is fastened to the slotted bracket 36. The cam follower roller 30 is adapted to rest in both indents or grooves of the discs 23 and 24 of cam 21 when both of these indents register with each other. The discs 23 and 24 are individually adjustable on the shaft on which they are mounted, as by loosening mounting screws and then tightening the screws after the desired disc is rotated to a desired position. Hence, the time or duration in which the cam follower rides within the indents (the period of dwell) is adjustable merely by suitably positioning the two discs of the cam 21 so that the indents on both discs register for the precise time interval during which it is desired that the wetting mechanism be effective to wet the stamps. Put in other words, the length of dwell of the cam follower 30 in the indents of cam 21 determines how long the wetting pad rests against the stamps. By lengthening the dwell, the wetting device can moisten one, two or three or any desired number of stamps to be affixed on an envelope during each cycle or revolution of the drum housing 20. When the cam follower roller 30 moves on the periphery of cam 21 and is outside of both indents 28, the movable end of resilient arched sheet 31 which holds the wetting pad 29 is withdrawn toward the bracket 36 and the pad does not contact the outer surface of cylindrically-shaped housing 20. However, when the cam follower roller 30 rides within both of the indents 28 of both discs 23 and 24, the movable end of arched sheet 31 is released outwardly, thereby permitting the wetting pad to contact the outer surface of the cylindrically-shaped drum housing 20.

THE SEVERING BLADE ASSEMBLY

For severing the stamps from the roll 22 along the lines of perforations, there is provided a cam-controlled thin severing blade 70 shown in detail in FIGS. 12 and 13. This blade is shown as a rectangular thin metal sheet with a cut out portion 71 having an arcuate-shaped severing surface 72. This arcuate-shaped severing surface is an important feature of the severing blade. The severing blade assembly is mounted on the cylindrical housing 20 immediately beyond the open end of moisture shield cover 51 at the location of the thicker material region 53 of the housing 20. Note FIG. 2. The blade itself has a pair of opposite edges tightly held in slots in a pair of cutter posts 74 and 75 and all three elements move in the two directions indicated by the bidirectional arrow 76 (note FIG. 13) in response to the movement of cam follower roller 77 over the irregular interior cam surface 128 of cam 27 (note FIGS. 11, 12 and 13). The cam follower includes a round rod 78, one end of which is tightly held in cutter post 74 either by a press fit or by a set screw. This same round rod 78 passes through cutter post 75 and is firmly held in position in post 75 by a set screw. Post 74 is shown as square in shape while post 75 is round. Although square cutter post 74 extends outside one edge of the cylinder of housing 20, the round post 75 passes through and slides within a hole in the metal of the cylinder of housing 20 near the opposite edge. Note FIGS. 2 and 7. The lower part of cutter post 75 below the rod 78, as shown in FIG. 13, is hollow and accommodates a resilient spring 79 which always acts in a direction to exert pressure against the cam follower rod. Thus the entire severing blade assembly including the blade 72 and the two cutter posts move bidirectionally as the cam follower roller 77 moves or rides over the irregular inner surface 128 of the cam 27. A metal block 80 is fastened to the surface of cam disc 23 which faces the housing 20. This metal block is provided with a slot 81 in which the rod 78 slides bidirectionally as the cam follower roller 77 moves over the cam 27. Note FIG. 7.

The thin blade 70 fits into and slides within a narrow but slightly wider slot 82 which extends completely through the cylindrical metal portion of housing 20. In the operation of the severing blade, it assumes three positions for each revolution of the cylindrical housing, as shown in FIG. 12(a), (b) and (c). In one position, corresponding to FIG. 12(a) and FIG. 13, the arcuate portion 72 of blade 70 is fully withdrawn outside the cylinder of housing 20 to enable the postage stamp 22' to pass therethrough. This position occurs when the cam follower roller 77 is in the region A on the irregular inner surface of cam 27, as shown in FIG. 11. In the second position, the blade 70 is partially retracted so that the arcuate surface 72 has descended to rupture the perforations at only both edges of the stamp roll, while the stamp 22' is still held on the roll by the centrally located uncut perforations. This second position occurs when the cam follower roller 77 is in the region B on the irregular inner surface 128 of cam 27 as shown in FIG. 11. In the third position, the blade 70 is fully retracted below the outer cylindrical surface of the housing 20 and has completely ruptured the entire line of perforations between adjacent stamps. This third position occurs when the cam follower roller 77 is in the region C on the irregular inner surface 128 of cam 27 as shown in FIG. 11. The regions A, B and C of the cam 27 are shown in dotted lines in FIGS. 3, 4, 5 and 6. These figures are front elevation views showing different positions of the cylinder housing 20 during a single cycle or revolution. It will thus be seen that the blade has two rupturing positions, one in which the postage stamp is only partially severed from the stamp roll and the other in which the postage stamp is completely severed from the stamp roll—this last action takes place after the gummed surface of the stamp has been moistened and immediately before the stamp is affixed to the printed matter, such as an envelope or card.

It should be noted that when the cam follower roller 77 is in the region A of the cam 27, the severing blade 72 is withdrawn above the outer cylindrical surface of housing, as shown in FIGS. 2 and 3. However, when the cam follower roller 77 is in the region B of the cam 27, in which position the stamp is only partially severed, the uppermost edge of the blade 77 has been retracted below the top surface of the moisture shield cover 51, as shown in FIG. 4, in order not to interfere with the wetting action of the stamp as the wetting pad 29 sweeps over the moisture shield cover 51 during the counter-clockwise rotation of the housing 20. In the final complete severing action of the stamp, when the cam follower roller 77 is in the region C of the cam 27, as shown in FIG. 6 and FIG. 12(c), the uppermost edge of blade 70 is fully retracted below the outer cylindrical surface of housing 20.

FIG. 4 shows the normal or rest position of the mechanism in which the stamp is only partially severed while being held on the roll, and before the tripping lever 14 actuates the spring-loaded clutch to cause the housing to turn for one revolution.

The blade 70 of the invention is purposely designed to provide a rupturing of the perforations between stamps as distinguished from a cutting action as achieved by a sharp knife blade. For this purpose the arcuate-shaped severing surface has a thin flat edge which, as the blade descends into the narrow slot 82 in the housing 20, bursts the paper between the perforations in the line of perforations, thus providing the same appearance on the severed stamps as though the stamps were torn by hand from the roll, thereby furnishing a personal touch to the stamps when they are affixed to the printed matter. In one embodiment built and successfully tested, the slot 82 in the housing 20 was approximately .003" wider than the thickness of the blade 70. When the blade descends to sever the stamp from the roll along the line of perforations, a double thickness of stamp (the stamp has a thickness of .004") tries to enter the slot 82 but cannot do so, hence the stamp ruptures along the line of perforations which is the weakest part of the stamp roll.

OPERATION OF INVENTION

After the roll of stamps 22 has been place into the housing and the stamps threaded through the pin roller, the passage of printed matter through the machine will trip lever 14 to cause the spring-actuated clutch to rotate the housing 20 for a single revolution. Each piece of printed matter will actuate the lever 14 and cause the cycle of operation to be repeated. Hence there is a continual intermittent motion of the cylindrical housing. The rest or normal starting position is shown in FIG. 4 where the stamp has been only partially severed and the severing blade is below the outer surface of the moisture shield cover. As the housing turns in a counter-clockwise direction, the cam follower roller 30 will enter the indents on cam 21 at a predetermined time and cause the wetting pad to contact and slide over the moisture shield cover to thereby wet or moisten only the stamp on the outer surface region 53 of the cylinder housing. As the housing continues to rotate, the wetting pad is withdrawn from the housing because the cam follower roller 30 will no longer dwell in the indents of cam 21. In the general position shown in FIG. 5, the cam follower roller 77 of the severing blade unit will then roll over region C of the cam A and cause complete severing of the stamp, immediately after which the stamp is affixed on the advancing printed matter at the location shown in FIG. 6. A spring-loaded idler ejector roller 90, driven by a roller 91 on the base 8 (shown in dotted lines in FIG. 8) serves to advance the stamped printed matter away from the machine. If desired, the ejector roller may be followed by one or more pairs of stamp press-down rollers, not shown, between which the stamps affixed on printed matter will pass for guaranteeing positive adhesion of the stamp on the printed matter.

As the housing continues to advance in a counter-clockwise direction, the cam follower roller 77 of the severing blade assembly will pass region C of the cam 27 and ride over region A of cam 27 at which time the blade 70 will be withdrawn away from the outer surface of the housing 20 in the position shown in FIGS. 2, 3, 12(a) and 13 in which the cut out portion 71 is fully exposed to permit the entry of a stamp therethrough. It is at this position that a spoke 55 on the wheel 54 engages the stationary lug 56 of the stationary metallic cover 57 to thereby cause the wheel 54 and pin roller 43 to rotate one-quarter turn and advance a stamp under the arcuate-shaped rupturing surface 72 of the blade 70. This cycle of operations is repeated for each revolution of the housing in response to each movement of the trip lever 14. The postage stamp affixer attachment is able to take the roll of stamps with printed side out as supplied by the Government and turn the stamps without rewinding to expose the gummed side of the stamps to the wetting device.

A register R records the number of revolutions of the housing or casing 20 and hence the amount of printed matter upon which stamps have been affixed.

The invention provides a stamp driver mechanism which is self-indexing and permits a simple and easy adjustment for the needles which advance the postage stamp roll.

What I claim is:

1. Stamp driver mechanism for advancing a roll of stamps having spaced rows of perforations extending transversely of the roll, a cylindrical plug having a hollow interior, a shaft in the interior of said plug, spaced rows of pins on said plug for successively entering said rows of perforations, means for rotating said plug relative to said shaft, and means for adjusting the position of said plug longitudinally in relation to said shaft, said plug being provided with radially arranged holes for individually accommodating said pins, and skewed holes having threaded interiors individually communicating with said radially arranged holes for accommodating set screws to secure said pins in said radially arranged holes.

2. Stamp driver mechanism as defined in claim 1, wherein said shaft is fixedly mounted at one end in a supporting wall, and said plug is rotatable on said shaft, a compression spring mounted on said shaft between said wall and said plug and exerting outward pressure against said plug, said shaft having a threaded hole at the free end thereof, a retaining screw also at the free end of said shaft and located outside the free end of said plug and threadedly engaging said threaded hole for retaining said plug in position on said shaft against said spring, said last means including an element for exerting pressure against the free end of said plug in a direction against said spring.

3. Stamp driver mechanism according to claim 2, wherein said plug has an interiorly positioned shoulder against which one end of said spring rests, said hollow interior having a diameter large enough to accommodate said compression spring, and an outer shell surrounding cylindrical plug for its entire length, said outer shell having spaced rows of holes registering with the locations of the pins on said plug, said pins being sufficiently large to protrude above the peripheral surface of said shell.

4. Stamp driver mechanism as defined in claim 1, wherein said shaft is fixedly mounted at one end to a wall arranged at right angles thereto, and said plug is rotatable on said shaft, said plug having four rows of holes which rows are uniformly spaced apart from one another by one-quarter of the circumference of said plug.

5. Stamp driver mechanism according to claim 1, wherein said plug is fixedly mounted at one end in a supporting wall and said plug has an interiorly positioned shoulder, a compression spring mounted around said shaft between said wall and said shoulder, the hollow interior of said plug having a diameter large enough to accommodate said spring, and an outer shell completely surrounding said plug, said shell having radially arranged holes and skewed holes which are adapted to respectively register with but are larger than the radially arranged and skewed holes of said plug.

6. Stamp driver mechanism according to claim 1, wherein said plug is fixedly mounted at one end in a supporting wall and said plug has an interiorly positioned shoulder, a compression spring mounted around said shaft between said wall and said shoulder, the hollow interior of said plug having a diameter large enough to accommodate said spring, and an outer shell completely surrounding said plug, said shell having radially arranged holes and skewed holes which are adapted to respectively register with but are larger than the radially arranged and skewed holes of said plug, said plug having a pair of spaced guide pins in the end thereof farthest removed from said wall, and said shell having a pair of spaced holes at the closed end thereof for enabling said guide pins on said plug to enter therein, whereby both said plug and shell rotate as a single unit and independent rotary movement therebetween is prevented.

7. Stamp driver mechanism for advancing a roll of stamps having spaced rows of perforations extending transversely of the roll, a cylindrical metallic plug having a hollow interior, a shaft in the interior of said plug, spaced rows of pins on said plug, a metallic hollow shell completely surrounding said plug, said shell having spaced rows of holes registering with said spaced rows of pins, said holes having diameters appreciably wider than the thicknesses of said pins for enabling adjustment of position of said pins on said plug relative to said holes, means for rotating said shell and plug as a single unit relative to said shaft, and means for adjusting the position of said plug longitudinally on said shaft relative both to said shaft and shell.

8. Stamp driver mechanism according to claim 7, wherein said shaft is supported at one end in a wall, said shell has a closed end which is farthest removed from said wall, said closed end integral with said shell and having a star-shaped metallic wheel having a plurality of radially positioned arms protruding from but parallel to said closed end, said means for rotating said shell and plug as a single unit including a stud for impacting said radially positioned arms individually.

9. Stamp driver mechanism according to claim 8, wherein said star-shaped wheel has four tapered arms, two of said oppositely disposed arms having threaded holes extending completely therethrough and through the closed end of said shell, and screws threadedly engaging said threaded holes and having ends adapted to contact the adjacent end of said interiorly positioned cylindrical metallic plug, the other two oppositely disposed arms also having holes therein, said adjacent end of said interiorly positioned cylindrical metallic plug having guide pins which are adapted to enter said last two holes.

References Cited

UNITED STATES PATENTS

| 2,644,562 | 7/1953 | Pettus | 226—76 X |
| 2,724,279 | 11/1955 | Davidson | 74—243 |

RICHARD A. SCHACHER, Primary Examiner

U.S. Cl. X.R.
74—243; 226—87